(12) United States Patent
Li et al.

(10) Patent No.: US 11,834,610 B2
(45) Date of Patent: Dec. 5, 2023

(54) ULTRA-HIGH TEMPERATURE ORGANIC CROSS-LINKED FRACTURING FLUID SYSTEM

(71) Applicant: Southwest Petroleum University, Chengdu (CN)

(72) Inventors: Yongming Li, Chengdu (CN); Qiang Ren, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/085,158

(22) Filed: Dec. 20, 2022

(65) Prior Publication Data

US 2023/0193117 A1 Jun. 22, 2023

(30) Foreign Application Priority Data

Dec. 21, 2021 (CN) .......................... 202111586252.3

(51) Int. Cl.
*C09K 8/68* (2006.01)
(52) U.S. Cl.
CPC .................................. *C09K 8/685* (2013.01)
(58) Field of Classification Search
None
See application file for complete search history.

(56) References Cited

U.S. PATENT DOCUMENTS

2020/0332043 A1   10/2020   Ren et al.

FOREIGN PATENT DOCUMENTS

| CN | 102433111 A | 2/2012 |
|---|---|---|
| CN | 104497220 A | 4/2015 |
| CN | 104877078 A | 9/2015 |
| CN | 107459604 A | 12/2017 |
| CN | 108690584 A | 10/2018 |
| CN | 109053959 A | 12/2018 |

(Continued)

OTHER PUBLICATIONS

Wen, Zhai et al., Rheological behaviors and temperature resistant mechanism of an ultra-high temperature fracturing fluid, 2014, 6 pages.

(Continued)

*Primary Examiner* — Andrew Sue-Ako
(74) *Attorney, Agent, or Firm* — MUNCY, GEISSLER, OLDS & LOWE, P.C.

(57) ABSTRACT

An ultra-high temperature organic cross-linked fracturing fluid system consisting of the following components at mass percentages: 0.6 wt % of a supramolecular star-shaped polymer, 0.5-1.0 wt % of formaldehyde solution, 0.02-0.04 wt % of resorcinol, 0.05-0.2 wt % of an ammonium catalyst and the rest being water, wherein the supramolecular star-shaped polymer is a β-cyclodextrin-modified branched monomer F-β-CD that serves as a core and is grafted with acrylamide, acrylic acid, hydrophobic monomers and surface-active macromolecular monomers to form a supramolecular star-shaped polymer; the ammonium salt catalyst is one or more of ammonium chloride, ammonium bicarbonate, ammonium acetate, ammonium citrate, ammonium benzoate and ammonium oleate. The ultra-high temperature organic cross-linked fracturing fluid system uses a supramolecular star-shaped polymer as a thickener, an organic crosslinker as a crosslinker and an ammonium salt as a catalyst to form a fracturing fluid.

3 Claims, 2 Drawing Sheets

(56) References Cited

FOREIGN PATENT DOCUMENTS

| | | |
|---|---|---|
| CN | 109485805 A | 3/2019 |
| CN | 110423602 A | 11/2019 |
| WO | WO-2017/046506 A1 | 3/2017 |

OTHER PUBLICATIONS

Xu, Ke et al., Research and performance analysis of 245° C. ultra-high temperature fracturing liquid thickener, Applied Chemical Industry, Dec. 2020, pp. 3031-3033, vol. 49 No. 12.

Search Report dated May 5, 2022 issued in corresponding China Application No. 202111586252.3.

Office Action dated May 16, 2022 issued in corresponding China Application No. 202111586252.3 (with English translation).

Supplemental Search Report dated May 30, 2022 issued in corresponding China Application No. 202111586252.3 (with English translation).

Decision to Grant a Patent dated Jun. 2, 2022 issued in corresponding China Application No. 202111586252.3 (with English translation).

ULTRA-HIGH TEMPERATURE ORGANIC CROSS-LINKED FRACTURING FLUID SYSTEM

FIELD OF THE INVENTION

The present invention pertains to the technical field of oil and gas field production enhancement, and specifically relates to an ultra-high temperature organic cross-linked fracturing fluid system in an acid fracturing process.

BACKGROUND OF THE INVENTION

Hydraulic fracturing is an unconventional reservoir reconstruction technology having an prospect of wide applications, and acts as an important tool for the economic and efficient development of oil and gas resources such as a tight oil reservoir, a tight gas reservoir, a shale oil reservoir, a shale gas reservoir, a coalbed methane reservoir, a carbonate reservoir and a deep/ultra-deep well reservoir.

An ultra-high temperature reservoir is deeply buried (more than 7000 m), and have dense rock and high temperature (generally over 200° C.), for example, in the Tarim oil field and the Qinghai oil field, ultra-deep ultra-high temperature wells exceeding 240° C. have been successively bored, so the development of deep ultra-high temperature reservoirs demands an ultra-high temperature fracturing fluid. In 2014, Zhai Wen et al. had used 2-acrylamide-2-methylpropanesulfonic acid (AMPS), N-vinylpyrrolidone (NVP) and N,N-dimethylacrylamide (DMAM) as comonomers and made an aqueous solution polymerization to produce a terpolymer FA-313, thus the resultant fracturing fluid formulation includes 0.6% of a FA-313 ternary copolymer thickener, 0.6% of a constant chain chelating crosslinker FAG-18, 0.4% of a delayed crosslinking modifier additive and 0.2% of a FACM-41 cleanup additive. The fracturing fluid is able to maintain viscosity at 90 mPa-s after continuous shearing lasting 90 min at 240° C. and a shear rate of 100 $s^{-1}$ (Zhai Wen, Wang Liwei, Qiu Xiaohui, et al. Study on the temperature resistance mechanism and rheology of super-polymer high-temperature fracturing fluids at 240° C. 12$^{th}$ National Conference on Rheology. 2014). In 2020, Xu Ke, et al. had copolymerized acrylamide (AM), N,N-dimethylacrylamide (DMAM), 2-acrylamide-2-methylpropanesulfonic acid (AMPS), N-vinylpyrrolidone (NVP) and acrylic acid (AA) in a mass ratio of 60:20:20:0.5:1 to produce a five-membered copolymer thickener, thus the resultant fracturing fluid formulation includes 0.6% of a five-polymer thickener, 1% of a crosslinker FAC-206, 0.5% of a high-temperature modifier additive FAA-240 and 0.8% of a high-temperature stabilizer FAT-240. The fracturing fluid has viscosity up to 158.17 mPa-s after continuous shearing lasting 120 min at 245° C. and a shear rate of 100 $s^{-1}$ (Xu Ke, Hou Zongfeng, Chang Jin, et al. Preparation and performance analysis of thickeners for an ultra-high temperature fracturing fluid resistant to 245° C.[J]. *Applied Chemistry*, 2020, 49(12): 3031-3033).

However, the existing ultra-high temperature fracturing fluid mainly adopts a way to cross-link synthetic polymers with organic metal, so it takes a short cross-linking time less than 100 s, and no more than 15 min, which not only brings difficulties to on-the-spot field fluid dispensing, but also may cause accidents such as sand jam and sand plug, and is disadvantageous to control on seam heights.

SUMMARY OF THE INVENTION

An objective of the present invention is to provide an ultra-high temperature organic cross-linked fracturing fluid system, which uses a supramolecular star-shaped polymer as a thickener, an organic crosslinker as a crosslinker and an ammonium salt as a catalyst to form a fracturing fluid having low costs, an appropriate cross-linking time and stable viscosity at an ultra-high temperature, which is suitable for large-scale promotion and use and has an prospect of wide applications.

In order to achieve the above technical objectives, the present invention adopts the following technical solutions.

An ultra-high temperature organic cross-linked fracturing fluid system consists of the following constituents at mass percentages: 0.6 wt % of a supramolecular star-shaped polymer, of formaldehyde solution, 0.02-0.04 wt % of resorcinol, 0.05-0.2 wt % of an ammonium catalyst and the rest being water.

Except for the supramolecular star-shaped polymer, the rest of all constituents of this fracturing fluid system are commercially available.

The supramolecular star-shaped polymer is a supramolecular star-shaped polymer with β-CD as a core having a β-cyclodextrin-modified branched monomer F-β-CD that serves as a core and is grafted with acrylamide, acrylic acid, hydrophobic monomers and surface-active macromolecular monomers to form a supramolecular star-shaped polymer.

The β-cyclodextrin-modified branched monomer F-β-CD has the following structure.

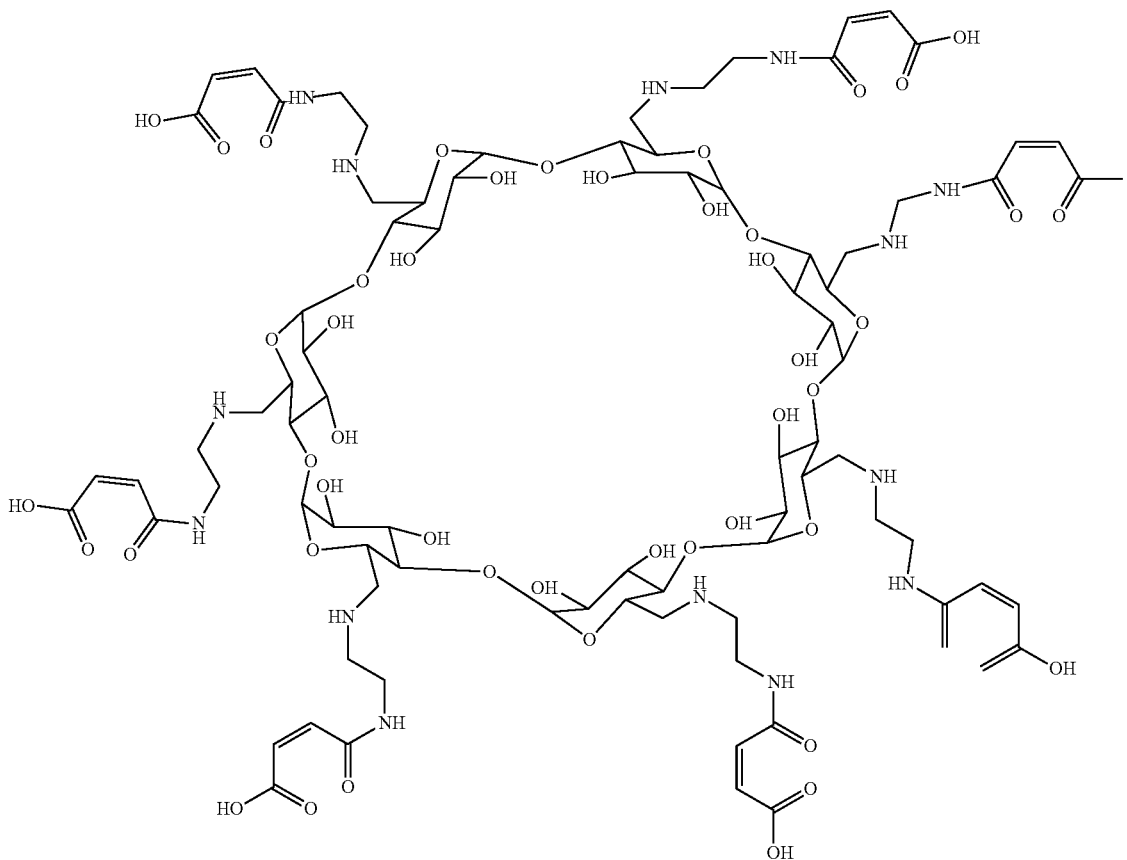

In the supramolecular star-shaped polymer with β-CD as a core, its branch chain has the following structural formula,

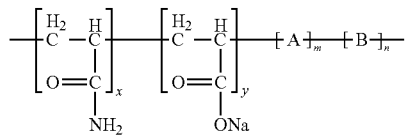

where, x, y, m and n are a percentage of a structural unit, x is 70-85%, y is 10-25%, m is n=1-x-y-m; A is a hydrophobic monomer, which is one or more of N-benzyl-N alkyl (meth) acrylamide and N-phenethyl-N alkyl (meth) acrylamide; B is a surface-active macromolecular monomer, which is one or more of allyl polyoxyethylene ether, Alkyl phenol polyoxyethylene ether (methyl) acrylate, alkyl phenol polyoxyethylene ether allyl ether, alkyl alcohol polyoxyethylene ether (meth)acrylate and alkyl alcohol polyoxyethylene ether allyl ether; the supramolecular star-shaped polymer with β-CD as a core has a viscosity-average molecular weight of 1 to 8 million.

The method for preparing the forementioned supramolecular star-shaped polymer includes the following steps in sequence:

S1: preparing a β-cyclodextrin-modified branched monomer F-β-CD, provided in its procedures as follows:

S11: making β-cyclodextrin react with p-toluenesulfonyl chloride by means of anhydrous pyridine as a solvent to prepare all-6-position sulfonylated β-cyclodextrin Ts-β-CD;

S12: next making the all-6-position sulfonylated β-cyclodextrin Ts-β-CD react with ethylenediamine by means of methanol as a solvent to prepare all-6-position ethylenediamine-substituted β-cyclodextrin EDA-β-CD having high reactivity; and S13: finally making the all-6-position ethylenediamine-substituted β-cyclodextrin EDA-β-CD react with maleic anhydride by means of dimethyl sulfoxide as a solvent to give the target product, β-cyclodextrin-modified branched monomer F-β-CD; and S2: preparing a supramolecular star-shaped polymer with β-CD as a core, provided in its procedures as follows:

S21: adding acrylamide, acrylic acid and surface-active macromolecular monomers to distilled water, adjusting the resultant solution's pH to about 7 with 10% NaOH solution; then adding hydrophobic monomers and a surfactant, sodium dodecyl sulfate, stirring the resultant solution until it becomes clear and transparent; next adding the β-cyclodextrin-modified branched monomer F-β-CD, aerating the resultant solution with nitrogen for more than 15 min to remove dissolved oxygen from it; and S22: adding a photoinitiator to the de-oxygenated system to give a solution, then placing the solution to react under a photoinitiation device for 3-5 h at a reaction temperature of so as to obtain a white colloid, that is, a supramolecular star-shaped polymer with β-CD as a core.

The photoinitiator is azodiisobutyramidine hydrochloride (v50).

In S21, the total mass fraction of monomers in the reaction system is 20-25%, of which is the acrylamide's mass fraction, 2-5% is the acrylic acid's mass fraction, 0.1-0.3% is the hydrophobic monomer's mass fraction, 0.2-0.6% is the surface-active macromolecular monomer's mass fraction, 0.4-0.8% is the sodium dodecyl sulfate's mass fraction, and the mass of the β-cyclodextrin-modified branched monomer F-β-CD is 0.3-0.5%0 of the total mass of monomers.

The ammonium salt catalyst is one or more of ammonium chloride, ammonium bicarbonate, ammonium acetate, ammonium citrate, ammonium benzoate and ammonium oleate.

During the pumping process, the fracturing fluid system has a low temperature and the good viscoelasticity of the supramolecular star-shaped polymer itself enables the system to carry sand; after the system is pumped into the formation, its temperature rises at contact with formation rock and formation fluid; Formaldehyde/resorcinol, serving as a temperature-responsive organic crosslinker, can form high-strength covalent bond crosslink with the supramolecular star-shaped polymer under the function of temperature and an ammonium catalyst, and eventually enables the temperature resistance of the compounded fracturing fluid to reach 220-240° C., greatly expanding the temperature range for use of fracturing fluid.

For NH$_4$Cl taken as an example, its catalytic mechanism is as follows.

Hydrolysis of NH$_4$Cl in aqueous solution:

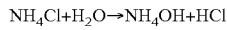

NH$_4$Cl+H$_2$O→NH$_4$OH+HCl

Decomposition of NH$_4$Cl under high temperature conditions:

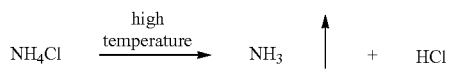

The reaction of NH$_4$Cl with formaldehyde is more complex and can be approximately summarized as follows.

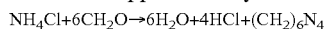

NH$_4$Cl+6CH$_2$O→6H$_2$O+4HCl+(CH$_2$)$_6$N$_4$

Compared to the prior art, the present invention has the following beneficial effects.

(1) For the present invention adopts three functional monomers, it has the following advantages: introducing a branched structure enables the supramolecular star-shaped polymer to have an overall performance of temperature resistance, salt resistance, shear resistance and easy solubility; adopting a double-tailed structure for the hydrophobic monomer enables both the hydrophobic association to strengthen and the risk of hydrophobic monomers hydrolysis to decrease; and introducing a non-ionic surfactant monomer enables hydrophobic association to improve.

(2) The organic crosslinker is a commonly-used crosslinker and has low costs.

(3) The ultra-high temperature resistant fracturing fluid has a long cross-linking time at room temperature, so it helps to compound on site.

(4) The said ultra-high temperature fracturing fluid has a maximum operating temperature up to 240° C. at 170 s$^{-1}$ under the continuous shear, so it is suitable for ultra-high temperature fracturing reconstruction in formations at 220-240° C.

DETAILED DESCRIPTION OF SOME EMBODIMENTS

Figure 1:
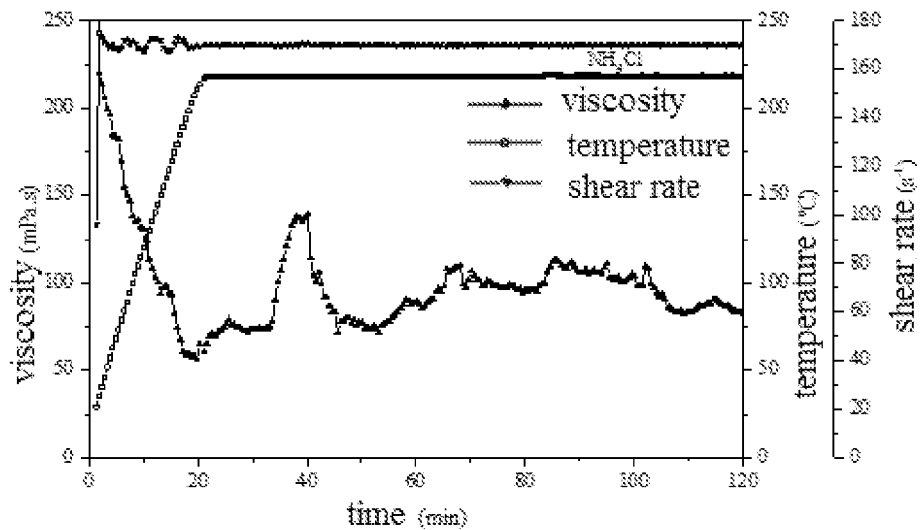
FIG. 1 shows a rheological curve of the ultra-high temperature organic cross-linked fracturing fluid in Example 1 at 170 s$^{-1}$ and 220° C.

We shall further describe the present invention according to the following drawings and examples, so that a person skilled in the art can understand the present invention. However, it should be understood that the present invention is not limited to the scope of specific embodiments, and for a person skilled in the art, any variation within the essence and scope of the present invention defined and determined by the attached claims falls within the protection of the present invention.

Example 1

The supramolecular star-shaped polymer is prepared via the following steps.

S1: Preparing a β-cyclodextrin-modified branched monomer F-β-CD. Its procedures are detailed as follows.

S11: Freshly-dried β-CD (14.0 g, 12.3 mmol) is put into a three-necked flask, then 100 mL of dried pyridine is poured into it at room temperature under a magnetic stir to dissolve the solid well. After complete dissolution, a pyridine solution of p-toluenesulfonyl chloride (16.9 g, 88.6 mmol) is dropped under ice water bath conditions. After dropwise addition, the reaction system rises to room temperature and reacts for 24 hours. The solvent, pyridine, is recycled by rotary evaporation to give a rude product, then the crude product is put into a large amount of cold water and suction filtrated to give a white precipitate, which is washed with either 100 mL of water and ether, respectively, to give another crude product; this crude product is stirred in methanol for 30 min at 62-65° C. and suction filtrated to give a wet solid; the wet solid is dried under vacuum at 40° C. to give a white solid, all-6-position p-toluenesulfonyl β-cyclodextrin ester, denoted as Ts-β-CD, its yield is about 85%.

S12: Ts-β-CD (27.15 g, 12.3 mmol) reacts with excess ethylenediamine (5.92 mL, 88.6 mmol) in methanol (50 mL) serving as a solvent t at 40° C. for 48 hours. At the end of the reaction, a yellow liquid occurs, then the methanol and the excess ethylenediamine are removed by rotary evaporation to give a crude product, the crude product is dissolved in an appropriate amount of water, then this solution is dropped into a large amount of cold acetone solution for precipitation, next the resultant precipitate is suction filtrated and washed with ethanol, finally dried under vacuum at 40° C. to give a white solid, all-6-position ethylenediamine-substituted β-cyclodextrin, denoted as EDA-β-CD, its yield is about 91.5%.

S13: EDA-β-CD (5.0 g) is dissolved in dimethyl sulfoxide (25 mL) to give resultant solution, which is poured into a three-necked flask; anhydrous dimethyl sulfoxide solution (20 mL) where 2.5 g of maleic anhydride is dissolved is slowly dropped into the solution in the condition of an ice-salt bath aerated with nitrogen. After dropwise addition, the reaction continues for 24 hours at room temperature. The reaction solution is repeatedly precipitated in a large amount of cold acetone, then washed and suction filtrated to give a slightly yellowish solid, β-cyclodextrin-modified functional monomer, denoted as F-β-CD, its yield is about 78%.

S2: Preparing a supramolecular star-shaped polymer with β-CD as a core. Its procedures are detailed as follows.

S21: 9.6 g of acrylamide, 2.5 g of acrylic acid and 0.3 g of surface-active macromonomer, lauryl polyoxyethylene ether methacrylate, are put into distilled water, of this solution, the pH is adjusted to about 7 with 10% NaOH solution, then 0.1 g of hydrophobic monomers, N-benzyl-N-dodecyl methacrylamide, and 0.25 g of surfactants, sodium dodecyl sulfate, are put into the solution, the resultant solution are stirred until it is clear and transparent, next β-cyclodextrin-modified branched monomer F-β-CD (the total mass fraction of monomer is 0.4‰) is put into the resultant solution, and a certain amount of distilled water is poured to enable the total concentration of monomer to be 25%, finally the solution is aerated with nitrogen for more than 15 min to remove the dissolved oxygen in the solution.

S22: A photoinitiator, v50 (the total mass fraction of monomer is 0.2%) is put to the de-oxygenated system to give a solution, which is placed under a photoinitiation device to react for 4 h at 10-30° C. to give a white colloid, that is, a supramolecular star-shaped polymer with β-CD as a core.

The ultra-high temperature organic cross-linked fracturing fluid system has the following formula at mass percentages: 0.6 wt % of a supramolecular star-shaped polymer, 0.75 wt % of formaldehyde solution, 0.025 wt % of resorcinol, 0.1 wt % of ammonium chloride catalyst and the rest being water. Mixing and stirring all constituents gives the fracturing fluid.

An apparent viscosity-time curve of this fracturing fluid system tested at 170 s$^{-1}$ and 220° C. is shown in FIG. 1. It can be seen from FIG. 1 that the apparent viscosity of this fracturing fluid system first decreases and then increases, next decreases again and finally remains stable, as well as it remains at around 100 mPa-s after shear lasting 120 min, meeting requirements of ultra-high temperature fracturing.

Example 2

The preparation of the supramolecular star-shaped polymer is same as that of Example 1.

The ultra-high temperature organic cross-linked fracturing fluid system has the following formula at mass percentages: 0.6 wt % of a supramolecular star-shaped polymer, 0.75 wt % of formaldehyde solution, 0.025 wt % of resorcinol, 0.1 wt % of ammonium bicarbonate and the rest being water. Mixing and stirring all constituents gives the fracturing fluid.

Figure 2:
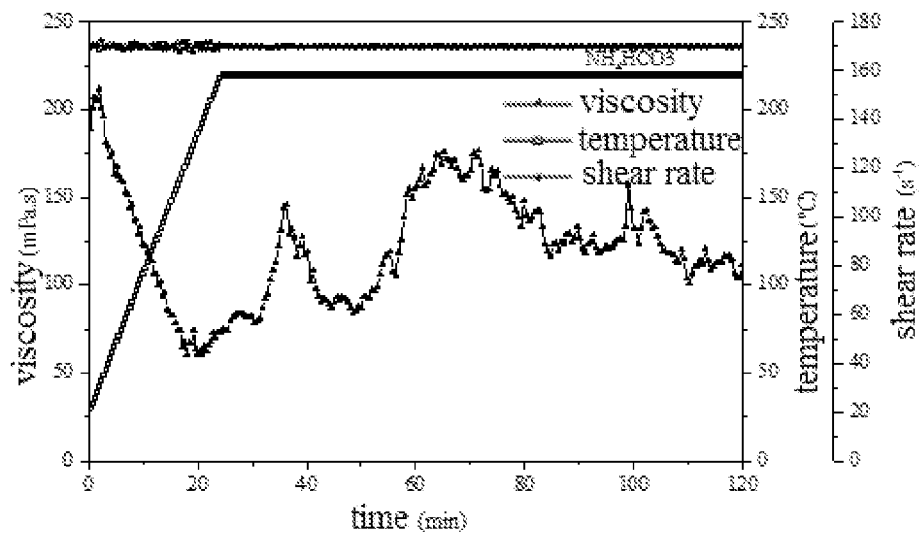
FIG. 2 shows a rheological curve of the ultra-high temperature organic cross-linked fracturing fluid in Example 2 at 170 s$^{-1}$ and 220° C.

An apparent viscosity-time curve of this fracturing fluid system tested at 170 s$^{-1}$ and 220° C. is shown in FIG. 2. It can be seen from FIG. 2 that the apparent viscosity of this fracturing fluid system first decreases and then increases, next decreases again and finally remains stable, as well as it remains at above 100 mPa-s after shear lasting 120 min, meeting requirements of ultra-high temperature fracturing.

Example 3

The preparation of the supramolecular star-shaped polymer is same as that of Example 1.

The ultra-high temperature organic cross-linked fracturing fluid system has the following formula at mass percentages: 0.6 wt % of a supramolecular star-shaped polymer, 0.75 wt % of formaldehyde solution, 0.025 wt % of resorcinol, 0.1 wt % of ammonium acetate and the rest being water. Mixing and stirring all constituents gives the fracturing fluid.

Figure 3:
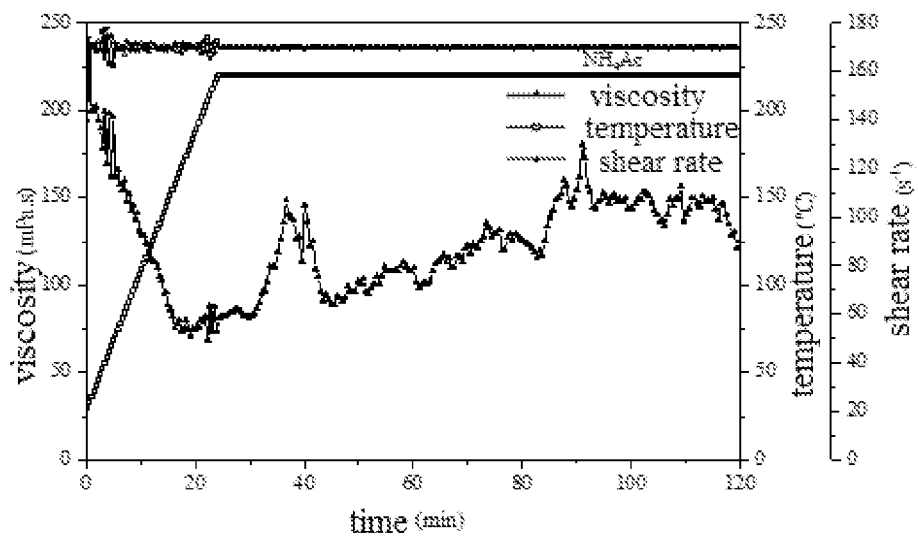
FIG. 3 shows a rheological curve of the ultra-high temperature organic cross-linked fracturing fluid in Example 3 at 170 s$^{-1}$ and 220° C.

An apparent viscosity-time curve of this fracturing fluid system tested at 170 s$^{-1}$ and 220° C. is shown in FIG. 3. It can be seen from FIG. 3 that the apparent viscosity of this fracturing fluid system first decreases and then increases, next decreases again and finally remains stable, as well as it remains at about 125 mPa-s after shear lasting 120 min, meeting requirements of ultra-high temperature fracturing.

Figure 4:
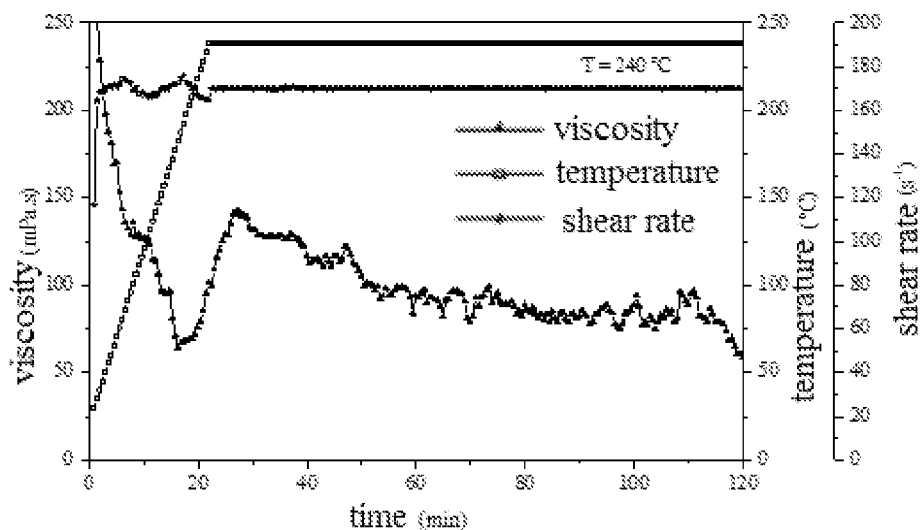
FIG. 4 shows a rheological curve of the ultra-high temperature organic cross-linked fracturing fluid in Example 4 at 170 s$^{-1}$ and 240° C.

An apparent viscosity-time curve of this fracturing fluid system tested at 170 s$^{-1}$ and 240° C. is shown in FIG. 4. It can be seen from FIG. 4 that the apparent viscosity of this fracturing fluid system first decreases and then increases, next decreases again and finally remains stable, as well as it remains at about 60 mPa-s after shear lasting 120 min, meeting requirements of ultra-high temperature fracturing.

What is claimed is:

1. An organic cross-linked fracturing fluid system consisting of the following constituents at mass percentages: 0.6 wt % of a supramolecular star-shaped polymer, 0.5-1.0 wt % of formaldehyde solution, 0.02-0.04 wt % of resorcinol, 0.05-0.2 wt % of an ammonium catalyst and the rest being water, wherein said supramolecular star-shaped polymer is a supramolecular star-shaped polymer with β-CD as a core having a β-cyclodextrin-modified branched monomer F-β-CD that serves as a core and is grafted with acrylamide, acrylic acid, hydrophobic monomers and surface-active macromolecular monomers to form a supramolecular star-shaped polymer;

the β-cyclodextrin-modified branched monomer F-β-CD has the following structure:

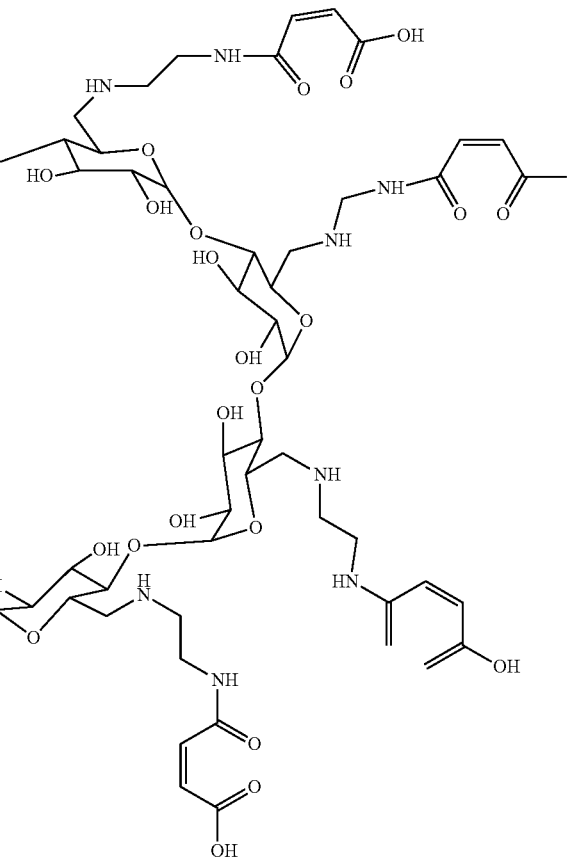

a branch chain of the supramolecular star-shaped polymer with β-CD as a core has the following structural formula,

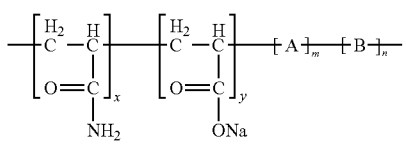

where, x, y, m and n are a percentage of a structural unit, x is 70-85%, y is 10-25%, m is 0.05-0.2%, n=1-x-y-m; A is the hydrophobic monomers, which is one or more of N-benzyl-N alkyl (meth) acrylamide and N-phenethyl-N alkyl (meth) acrylamide; B is the surface-active macromolecular monomers, which is one or more of allyl polyoxyethylene ether, alkyl phenol polyoxyethylene ether (methyl) acrylate, alkyl phenol polyoxyethylene ether allyl ether, alkyl alcohol polyoxyethylene ether (meth)acrylate and alkyl alcohol polyoxyethylene ether allyl ether; the supramolecular star-shaped polymer with β-CD as a core has a viscosity-average molecular weight of 1 to 8 million.

2. The organic cross-linked fracturing fluid system according to claim 1, wherein a method for preparing said supramolecular star-shaped polymer comprises the following steps in sequence:

S1: preparing the β-cyclodextrin-modified branched monomer F-β-CD, comprising:

S11: making β-cyclodextrin react with p-toluenesulfonyl chloride by means of anhydrous pyridine as a solvent to prepare all-6-position sulfonylated β-cyclodextrin Ts-β-CD;

S12: making the all-6-position sulfonylated β-cyclodextrin Ts-β-CD react with ethylenediamine by means of methanol as a solvent to prepare all-6-position ethylenediamine-substituted β-cyclodextrin EDA-β-CD having high reactivity; and S13: making the all-6-position ethylenediamine-substituted β-cyclodextrin EDA-β-CD react with maleic anhydride by means of dimethyl sulfoxide as a solvent to give the target product, the β-cyclodextrin-modified branched monomer F-β-CD; and S2: preparing the supramolecular star-shaped polymer with β-CD as a core, comprising:

S21: adding acrylamide, acrylic acid and the surface-active macromolecular monomers to distilled water to give a solution, adjusting the solution's pH to about 7 with 10% NaOH solution; then adding the hydrophobic monomers and a surfactant, sodium dodecyl sulfate into the solution to give a resultant solution, and stirring the resultant solution until it becomes clear and transparent; next adding the β-cyclodextrin-modified branched monomer F-β-CD into the resultant solution to give a still resultant solution, finally aerating the still resultant solution with nitrogen for more than 15 min to give a de-oxygenated system; and S22: adding a photoinitiator to the de-oxygenated system to give a S22 solution, then placing the S22 solution to react under a photoinitiation device for 3-5 h at a reaction temperature of 10-30° C., so as to obtain said supramolecular star-shaped polymer.

3. The organic cross-linked fracturing fluid system according to claim 1, wherein said ammonium catalyst is one or more of ammonium chloride, ammonium bicarbonate, ammonium acetate, ammonium citrate, ammonium benzoate and ammonium oleate.

\* \* \* \* \*